United States Patent [19]

Anes

[11] 4,060,666
[45] Nov. 29, 1977

[54] BATTERY CAPACITY INDICATOR FOR PRIMARY BATTERY

[75] Inventor: Lionel Anes, Califon, N.J.

[73] Assignee: Compagnie Industrielle des Piles Electriques Cipel, Perret, France

[21] Appl. No.: 660,464

[22] Filed: Feb. 23, 1976

[51] Int. Cl.² .............................................. H01M 6/02
[52] U.S. Cl. ....................................................... 429/91
[58] Field of Search ..................... 136/182; 429/90, 91, 429/92, 19

[56] References Cited

U.S. PATENT DOCUMENTS 1,450,059  3/1923  Becker .................................. 136/182

FOREIGN PATENT DOCUMENTS 894,217  4/1962  United Kingdom ................. 136/182

Primary Examiner—Donald L. Walton
Attorney, Agent, or Firm—Albert F. Kronman

[57] ABSTRACT

The remaining useful life of a battery is indicated by a mechanical resilient means for displaying the thickness of the battery electrode. A mechanical indicator shows the electrode thickness at a convenient and visible top area of the battery container. The indicator may be coupled to any primary electrode which changes its thickness during battery discharge. This type of indicator may be used with batteries having opaque containers and nontransparent electrolytes.

5 Claims, 7 Drawing Figures

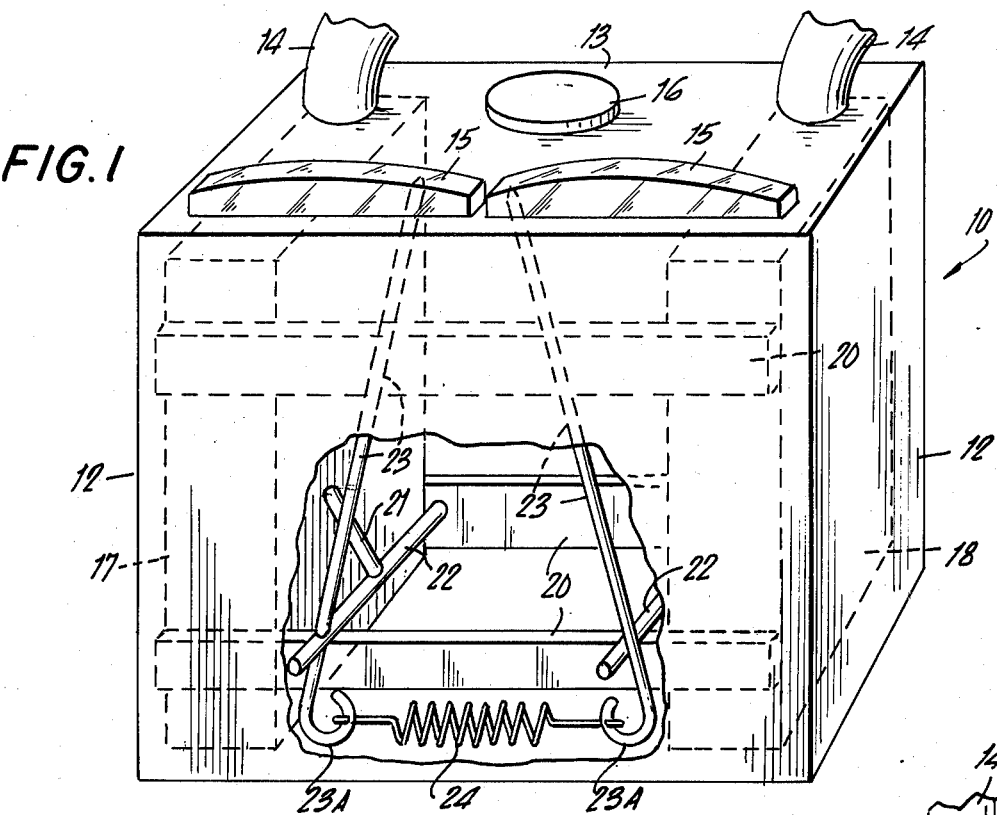
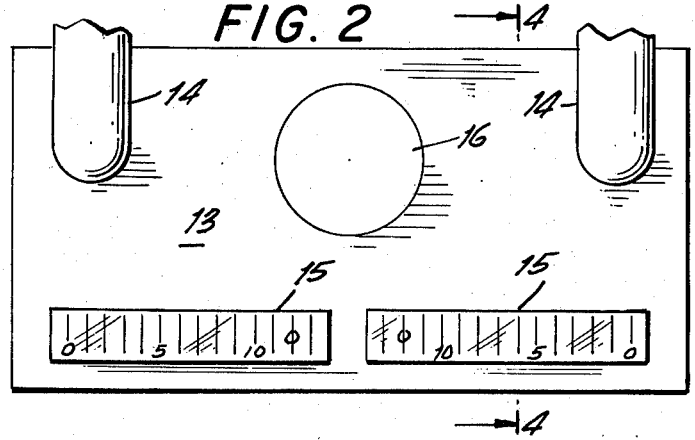
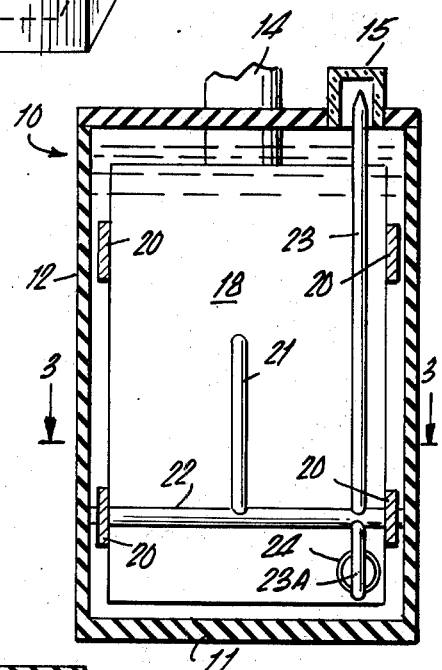
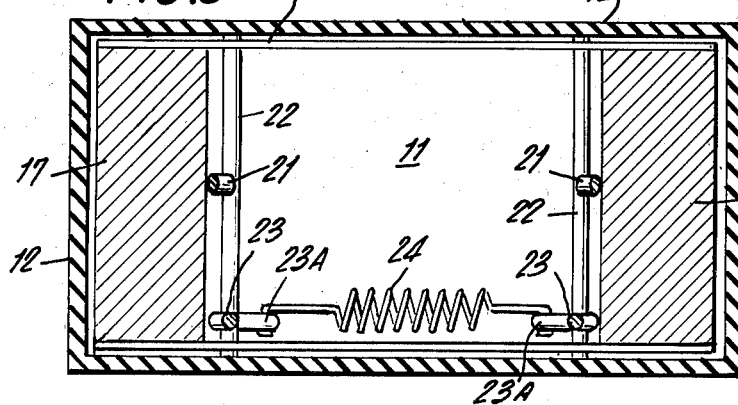

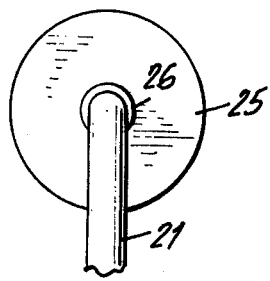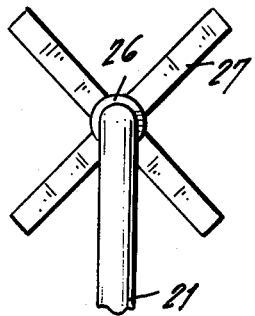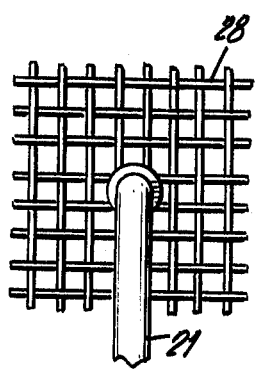

BATTERY CAPACITY INDICATOR FOR PRIMARY BATTERY

BACKGROUND OF THE INVENTION

All primary batteries generate electricity by chemical action and in all primary batteries the chemical action and the production of electricity stops when one of the electrodes is exhausted. Where batteries are essential to the operation of electrical apparatus such as telephones, signals and the like they must be replaced or repaired before they cease to function. For this reason, it is important to know the extent to which the electrode is used up, and to know the time when new electrodes must be furnished or when the entire primary battery is to be replaced.

The present invention provides a rugged mechanical battery life indicator, responsive to the dimensions of one or both of the electrodes. If the battery is a carbon zinc combination, only the zinc electrode is sensed and its thickness indicated. The indicator means is positioned at the top of the container for convenience of the user.

One of the features of the invention is the ability to use the exhaustion indicator with battery containers that are opaque. The indicators can also be used with electrolytes that are not transparent.

SUMMARY

The battery exhaustion indicator according to the present invention is used with primary batteries having at least one electrode which is depleted with use. The indicator comprises a sensing arm resiliently stressed against a portion of the electrode which becomes depleted during battery use. A rotatable support is secured to the sensing arm and resilient means, such as a helical spring, is coupled to the support for turning it so as to press the sensing arm against the electrode. An elongated indicator or pointer is coupled to the sensing arm which terminates in a free movable end adjacent to a calibrated scale for indicating the extent of electrode depletion.

Additional details of the invention will be disclosed in the following description, taken in connection with the accompanying drawings.

BRIEF DESCRIPTION OF THE FIGURES

FIG. 1 is a perspective view partly in phantom of a battery showing two partially depleted electrodes and two exhaustion indicators.

FIG. 2 is a top view of the battery showing the calibrated scales in greater detail.

FIG. 3 is a cross sectional view, taken along line 3—3 of FIG. 4, showing additional details of the resilient means.

FIG. 4 is a cross sectional view, taken along line 4—4 of FIG. 2.

FIG. 5 is a side view of an alternate form of sensing arm, terminated by a flat disk.

FIG. 6 is a side view of another alternate form of sensing arm, terminated by four additional arms.

FIG. 7 is a side view of still another alternate form of sensing arm, terminated by a woven wire mesh.

DESCRIPTION OF THE PREFERRED EMBODIMENT

FIGS. 1 through 4 show the details of the exhaustion indicator mounted in a fluid tight battery container. The container 10 includes the usual base 11, sides 12, and a top cover 13 which supports two leadin conductors 14 and two calibrated scales 15. A detachable vent 16 may be positioned on the top cover 13 but this is not always necessary. Inside the container two electrodes 17, 18 are positioned at opposite sides of the container and an electrolyte fills the remainder of the space within the container. The two electrodes are held in place by four mounting strips (20) which are conductors made of a material such as copper.

As mentioned above, the electrodes 17, 18 may be made of various materials, the zinc-carbon electrodes being only two of the many materials available for this purpose. The invention does not depend upon any particular composition of the electrodes but only upon electrodes which are depleted by use.

The exhaustion indicator for each of the electrodes includes a sensing arm 21 secured to a horizontal rotatable shaft 22. Shaft 22 is journalled in holes in the mounting strips 20 and is secured or otherwise coupled to an elongated indicating pointer 23 which extends slightly above the top cover 13. The ends of the pointer 23 may be tapered to increase the accuracy of the measurement. The pointer ends are positioned adjacent to the transparent scales 15, provided with graduations and indicia which give a measure of the movement of the sensing arms 21. The calibrated scales 15 are preferably mounted above the top surface of the cover 13 and above the top surface of the electrolyte as shown in FIGS. 1 and 4.

In order to maintain the sensing arms against the electrode surfaces, the indicating pointers 23 are, extended below the shafts 22 and terminated in a hook 23A. The hooks 23A are joined by a resilient means 24, shown in FIGS. 1, 3, and 4 as a helical tension spring. The spring urges the sensing arms 21 into a firm contact with their associates electrodes 17 and 18.

The operation of the exhaustion indicator is obvious from the figures and the above description. The indicator rods are initially set to indicate a reading on the scale, representing an unused state. As the battery is used and the electrode material depleted, the sensing arm 21 and the indicating pointers 23 move away from their original position, indicating the extent of the depleted electrode. As more electrical current is produced, the depletion of the electrode continues, and the sensing arms are moved farther from their original position. The replacement time is signaled when the indicating pointers 23 approach zero on the scale.

The sensing rods 21, as shown in FIGS. 1, 3, and 4, are short cylindrical insulator rods with a minimum area pressing on the electrode. It is well known that the depletion area is usually irregular and may be formed with hollows and bulges due to a varying chemical composition of the electrode. In order to sense an average depletion distance, the sensing arms can be fitted with a number of alternate contact terminations as shown in FIGS. 5, 6, and 7. The contact means 25 (FIG. 5) is a flat disk, secured to the end of sensing arm 21 by a flexible joint 26. The contact means 27 (FIG. 6) is a plurality of cross arms, mounted on joint 26 and bearing against a large area of the electrode. The contact means 28 is a web of insulator fibers 28, arranged to sense a large average space while permitting a large percentage of the current to flow from the sensed space through the woven fibers.

Having thus fully described the invention, what is claimed as new and desired to be secured by Letters Patent of the United States is:

1. A battery exhaustion indicator for use with a primary battery having at least one electrode which is depleted with use, comprising; a fluid tight case, a scale carried by the case, at least one sensing arm, resiliently urged against a major face of the battery electrode which is depleted with use; said sensing arm comprises a means for contacting a large average space on the said electrode; a rotatable shaft secured to the sensing arm, a resilient means coupled to the rotatable shaft for urging the sensing arm against the electrode major face and an elongated pointer coupled to said arm and having a free movable end adjacent to the scale for indicating the thickness of the depleted electrode.

2. A battery indicator according to claim 1 wherein the rotatable shaft is journalled in bearings secured to a fixed support means attached to one of the battery electrodes.

3. A battery indicator according to claim 1 wherein said sensing arm means is a flat disk.

4. A battery indicator according to claim 1 wherein the sensing arm means is a plurality of cross arms.

5. A battery indicator according to claim 1 wherein said sensing arm means is a web of insulator fibers completely insulated from the passage of current.

* * * * *